April 11, 1967    R. B. BARBER    3,313,918
SAFETY MEANS FOR OVEN DOOR LATCHING MECHANISM
Filed Aug. 4, 1964    2 Sheets-Sheet 1

INVENTOR.
RONALD B. BARBER
BY Richard L. Caslin
HIS ATTORNEY

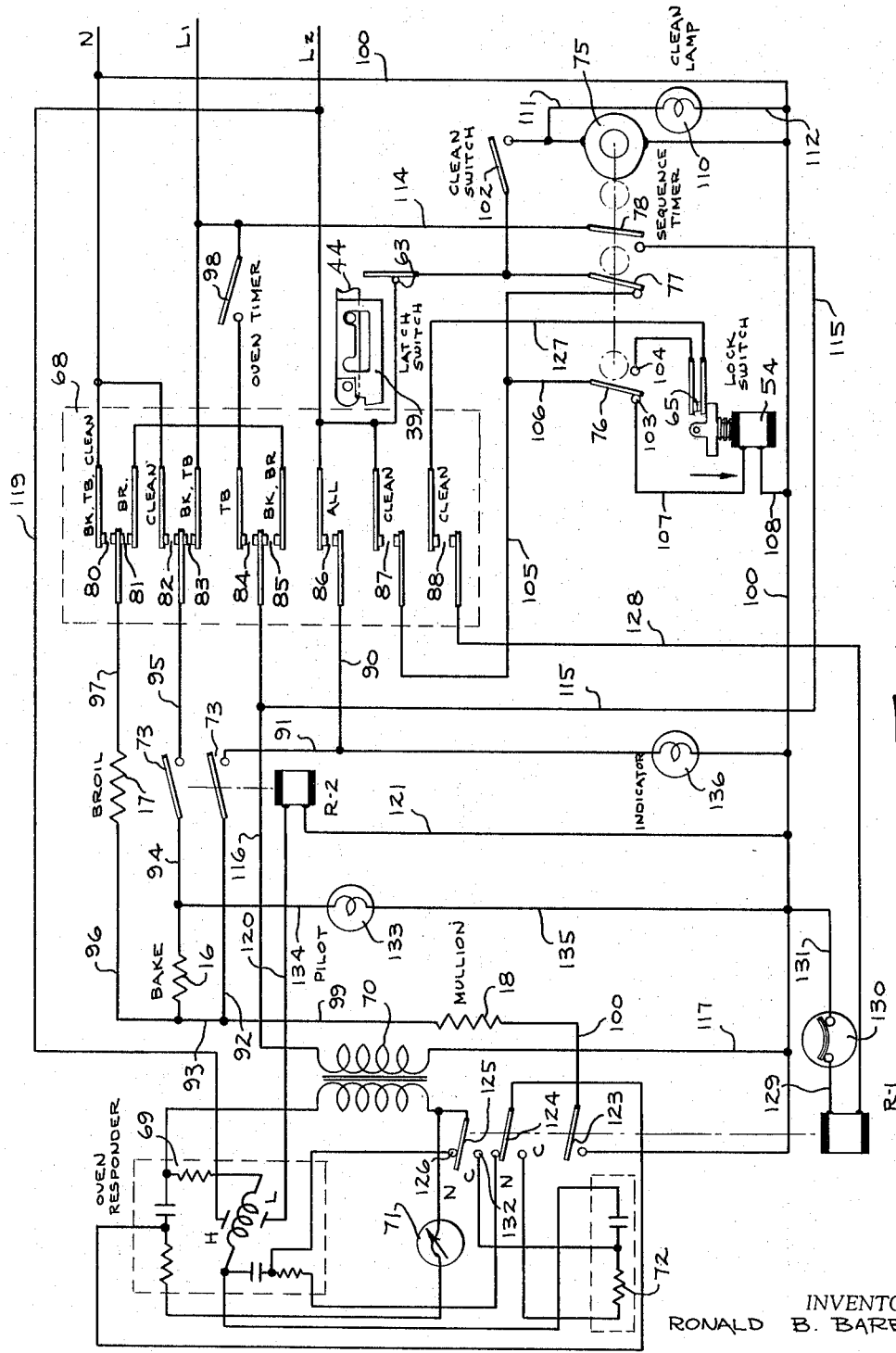

United States Patent Office 3,313,918
Patented Apr. 11, 1967

3,313,918
SAFETY MEANS FOR OVEN DOOR LATCHING MECHANISM
Ronald B. Barber, Marblehead, Mass., assignor to General Electric Company, a corporation of New York
Filed Aug. 4, 1964, Ser. No. 387,439
16 Claims. (Cl. 219—412)

The present invention relates to a latching means for the door of a baking oven, and particularly to a safety means to insure that the door may not be unlatched when the oven is operating in a high temperature range above normal cooking temperatures.

This invention is an outgrowth of the development of a self-cleaning oven as is taught in the recent patent of Bohdan Hurko, No. 3,121,158, which issued on February 11, 1964, and is assigned to the Geenral Electric Company, the assignee of the present invention. Such a self-cleaning oven would have the normal cooking functions of baking and broiling within a temperature range between about 150° F. and 550° F., as well as a heat cleaning operation where the temperature is raised to a maximum somewhere between about 750° F. and 950° F. for removing the food soil and grease spatter that accumulates on the walls of the oven liner during normal usage. Such a reaction may be characterized by the term pyrolysis which means the chemical decomposition of matter by the application of heat.

Undoubtedly, the major annoyance in using an oven for cooking is the difficulty encountered in keeping the walls of the oven liner clean after repeated usage. It is unavoidable that food particles and grease spatterings will accumulate and discolor on the hot oven surfaces during normal cooking operations. Strong chemical cleaning agents have been devised and are commercially available for the express purpose of removing food soil of this type under these conditions. However, even the best of these cleaning agents require a strong rubbing action, and a great deal of time and effort is needed to complete the task satisfactorily. Also, there is a safety hazard that the chemicals might cause injury to the user's hands or eyes if the directions for use are not followed closely.

Once the principle of pyrolysis was perfected for automatic oven cleaning, many different systems of applying the heat and controlling the cleaning operation were devised to obtain the desired results. To gain the maximum reliability, standard components were used where possible to take advantage of years of engineering development and know-how gained by working with the components, and they were arranged in fail-safe combination so that after years of trouble-free usage of the oven any failure of a component would not constitute a safety hazard. Instead, the failure of these components would render inoperative the heating circuit or function in which the component operates.

In such a high temperature oven, it is of primary importance to latch the oven door before the cleaning cycle is set in motion, and to insure that the door cannot be opened during the cycle so that only a measured amount of air enters the oven cavity during the pyrolytic process.

The principal object of the present invention is to provide a high temperature baking oven having a door latching means with an automatic locking means that locks the door latching means in its closed position, there being positive release means provided for the automatic locking means where the reelase means can only be operated after the completion of the heat cleaning cycle.

A further object of the present invention is to provide a door latching means of the class described with a first interlock switch means to insure that the door latching means is in its closed position before the high temperature cycle can be initiated, and a second interlock switch means to insure that the automatic locking means is in its closed position before the high temperature cleaning cycle can be initiated, where the safety controls for the oven are remotely located adjacent the rear of the oven in a relatively cool area.

A still further object of the present invention is to provide a door latching means of the class described with a spring biased locking means operative when the door latching means reaches its closed position or alternatively reaches either its open or its closed position, with the addition of an electrically responsive means for overcoming the spring biasing member only after the completion of a heat cleaning cycle.

The present invention, in accordance with one form thereof, is embodied in a heated cavity or cooking apparatus comprising walls defining an oven cavity where one wall of the cavity includes a door for gaining access thereto. A heating means either electric or gas is supplied for the oven and means is furnished to control the heating means for both normal cooking operations having a temperature range between about 150° F. and 550° F. as well as for a high temperature heat cleaning cycle where the maximum temperature reaches somewhere between about 750° F. and 950° F. A door latching means is movable between an open and a closed position, and it is adapted to seal the oven door when the temperatures are to be raised above the normal cooking temperatures. Associated with the door latching means is an automatic locking means that engages the door latching means in the closed position and prevents the manual operation of the door latching means. A release means is connected to the automatic locking means for overcoming the automatic locking means and freeing the door latching means for manual operation. The release means is controlled in such a way that it can only be operated after the completion of the heat cleaning cycle so as to insure that entry cannot be gained to the oven cavity when the oven temperatures are above the normal cooking temperatures. Other modifications include a first interlock switch means formed as part of the control means for the heat cleaning cycle so as to be closed only when the door latching means is in its closed position. Another modification is to incorporate a second interlock switch means in the control means for the heat cleaning cycle which is closed only when the automatic locking means is in its closed position before it is possible to energize the heat cleaning cycle. Further improvements incorporate the location of the two interlock switch means as well as the release means for the automatic locking means toward the back of the oven in a relatively cool area so that high temperature conditions do not adversely affect the operation thereof.

Two later versions of the present invention are incorporated in the designs of (1) an earlier filed copending application, Serial No. 323,809 of Clarence Getman entitled "Oven Door Latching System," and (2) an earlier filed copending application, Serial No. 323,810 of Samuel C. Jordan entitled "Circuitry For Electric Oven," now Patent No. 3,270,183, both of which applications were filed on November 14, 1963, and are assigned to the assignee of the present invention.

My invention will be better understood from the following description taken in conjunction with the accompanying drawings and its scope will be pointed out in the appended claims.

FIGURE 4 is a schematic diagram of the power and control circuits for the oven of the present invention.

Figure 1:
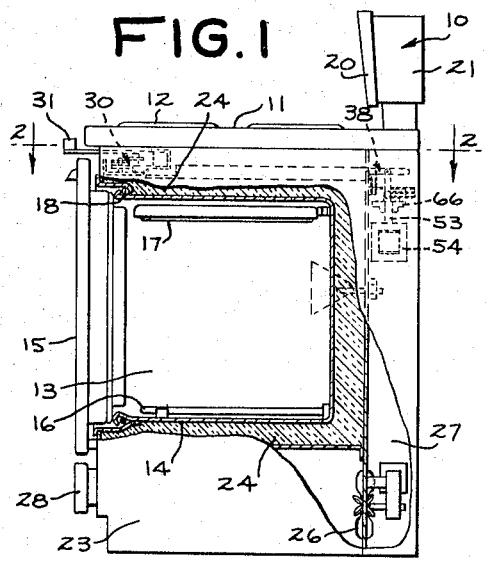
FIGURE 1 is a right side elevational view of a free-standing electric range embodying the present invention with parts broken away to show the oven cavity.

Turning now to a consideration of the drawings and in particular to FIGURE 1, there is shown for illustrative purposes a free-standing electric range 10 having a top cooking surface or cooktop 11 with a plurality of surface heating elements 12, an oven cavity 13 formed by a box-like oven liner 14 and a front-opening drop door 15. The oven cavity is supplied with two standard electric resistance heating elements; namely, a lower baking element 16 and an upper broiling element 17. A third heating element has been added adjacent the oven door 15, and it is a mullion or perimeter heater 18 that is wrapped around the oven liner in a manner that is taught by J. K. Newell, Jr., in his Patent 3,017,488 which is assigned to General Electric Company, the assignee of the present invention. The control of the surface heating elements 12 is obtained by selector switches (not shown) that are located in a control panel 20 formed in a backsplash 21 adjacent the back edge of the cooktop 11. This control panel also includes the control means for the various circuit combinations of the oven as well as temperature control thermostat and clock-timer devices as is old and well known in this art.

Other structural features that might be mentioned by name would be the outer range body or cabinet 23 which has an appearance finish on the outer surface and which supports and encloses the various components of the range. Sandwiched between the oven liner 14 and the range body is a thick blanket of thermal insulating material 24 such as fiber glass or the like. The amount of insulation being used has been increased over the ordinary amount of insulation used for standard ovens because of the high operating temperatures encountered during the heat cleaning operation which will reach a maximum oven air temperature somewhere between about 750° F. and about 950° F. Another component shown is an air circulating fan 26 located in the bottom portion of the range adjacent the back wall thereof and supported in an opening in an insulation guard panel 43. This fan serves to draw relatively cool room air into the range body 23 through the back of the backsplasher 21 and down a vertical air duct or wiring channel 27 at the back of the oven and into the bottom portion of the range that includes space for a pull-out drawer 28 for the storage of cooking utensils and the like. From this area the air rises up suitable ducts (not shown) built into the opposite side walls of the oven where the air is discharged under the cooktop 11 and is exhausted through openings in and around the surface heating elements 12.

Figure 2:
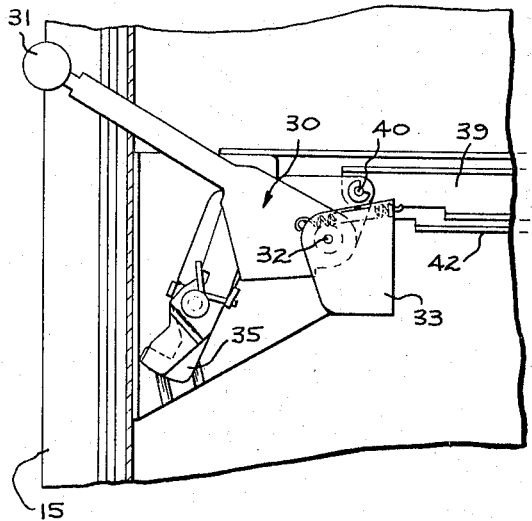
FIGURE 2 is a fragmentary plan view showing the oven door latching mechanism in an open position, taken on the line 2—2 of FIGURE 1.
Figure 2:
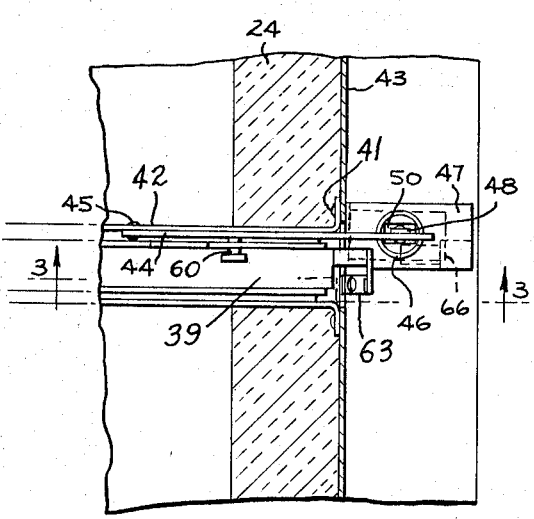

It has been found desirable to provide a latch means for the oven door 15 to insure that this door is closed and cannot be opened while the oven is being operated on the high temperature heat cleaning cycle. The particular door latch mechanism is identified as element 30 in FIGURE 1 and it is located in the area between the cooktop 11 and the top wall of the oven liner 14 adjacent the oven door. Only brief mention will be made of the exact nature of the door latching mechanism since it does not form part of the present invention but is disclosed and claimed in the copending application of Clarence Getman, Serial No. 277,174 which was filed on May 1, 1963, and issued June 15, 1965 as Patent 3,189,375 and is assigned to General Electric Company, the assignee of the present invention. The latch mechanism 30 includes a manually operable handle lever 31 which extends through an elongated slot in the front edge of the cooktop 11 in a position that parallels the top edge of the oven door 15. Referring to FIGURE 2, the handle lever 31 is pivotally supported about a vertical pivotal axis 32 from a stationary mounting bracket 33 that is fastened to the inner surface of the front of the cooktop 11. The handle lever 31 is shown in FIGURE 2 in its open position and it is adapted to swing through an angle of about 60° in moving to its closed position. The handle lever 31 operates a pivoted latching bolt 35 which is joined by a pin and slot, lost motion connection (not shown) which serves to swing the latching bolt 35 out of the range body and into engagement with a slotted keeper portion (not shown) formed on the inner surface of the oven door 15. Notice that the latching bolt 35 is recessed within the range body when the handle lever is in its open position as shown in FIGURE 2. Moreveor, the latching bolt 35 extends generally perpendicularly to the front wall of the cooktop 11 when the oven door is in its fully locked position.

The description given above has been for the purpose of setting the stage and explaining the environment in which the present invention functions. Associated with the door latching mechanism 30 is an automatic locking means generally identified as element 38 which is located at the rear of the oven and serves to lock the door latching mechanism 30 in both the open and closed positions of the mechanisms. The purpose of locking the door latching mechanism 30 in its open position is to insure that the handle lever cannot be thrown to the closed position inadvertently or by the tampering of a child. The latching mechanism is locked in the closed position to insure that the oven door 15 cannot be unlocked and the door opened during any part of the high temperature heat cleaning cycle.

Figure 3:
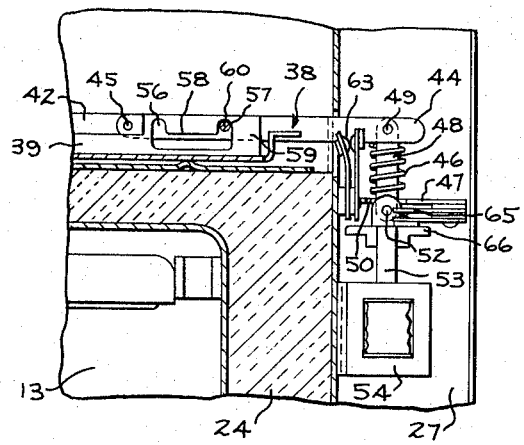
FIGURE 3 is a fragmentary cross-sectional elevational view taken at the back of the oven on the line 3—3 of FIGURE 2, but with the oven door latching mechanism moved to a closed position, and showing the automatic locking means for the door latching mechanism as well as a solenoid type release means.

Associated with the handle lever 31 and the automatic locking means 38 is a movable rod 39 that is pivotally connected at one end to the handle lever as by the pivot pin 40 and it extends rearwardly to the back of the oven as is best seen by comparing FIGURES 2 and 3. The reason for the movable rod 39 is to locate the automatic locking means 38 for the door latching mechanism 30 in a relatively cool area within the vertical air duct 27 so that several interlock switches 63 and 65 cooperating therewith will not be adversely affected by high temperatures. For purposes of support, a rigid upturned channel member or support bracket 42 parallels the movable rod 39 and is fixed at one end to the stationary mounting bracket 33 of the door latching mechanism and is fixed at its opposite end to an insulation guard 43 as by the fastening means 41 shown in FIGURE 2. Accordingly, as the handle lever 31 is shifted between its open to its closed positions, the movable rod 39 will reciprocate within the support bracket 42 through a short distance.

Now looking at FIGURE 3, the automatic locking means 38 for the door latching mechanism 30 is illustrated as a lever 44 that is pivotally connected at one end as at 45 to a vertical side flange of the support bracket 42. The opposite end of the lever 44 is supported on a compression spring member 46 which is seated on a fixed bracket 47. A spring retaining member 47 is in the form of a bolt 48 that extends through the center of the spring and is pivotally connected to the lever 44 as at 49. The lower end of this bolt 48 extends through an enlarged opening 50 in the bracket 47 and is pivotally connected as at 52 to a plunger 53 of a solenoid 54. The solenoid is available as a release means of the automatic locking means 38 to overcome the lifting force of the spring 46 as will be better understood hereinafter.

As is best seen in FIGURE 3, the rearmost end of the movable rod 39 is provided with a pair of spaced detents 56 and 57 that are joined by a horizontal slot 58. These detents and slot are formed in a vertical flange 59 of the movable rod 39 for cooperation with a horizontal pin 60 formed on the adjacent side of the lever 44. Thus, in order to move the handle lever 31 of the door latching mechanism 30, it is first necessary to depress the lever 44 so as to drop the pin 60 out of one of the detents 56 and 57 and into the horizontal slot 58. This unlocks the door latching mechanism for freedom of movement between its open and closed positions. This spring member 46 normally biases the lever 44 in an upward direction so that once the handle lever 31 reaches one of its extreme positions the spring 46 will tend to raise the lever 44 thereby positioning the locking pin 60 within one of the detents 56 or 57. Thus, the lever 44 and spring 46 serve as an automatic locking means 38 of the door latching mechanism 30.

Admittedly, an actuator or release means must be provided for lowering the lever 44 and unlocking the door latching mechanism. Such a release means is exemplified by the solenoid 54 which was mentioned earlier as being connected to the lever 44 through the plunger 53 and bolt 48. When the solenoid 54 is energized, the plunger is drawn downwardly thereby dropping the pin 60 out of one of the detents 56 or 57. Thus, when the solenoid is de-energized the lever 44 is free to move automatically into locking engagement with the door latching mechanism under the biasing force of the spring. Accordingly, a definite motion or force is necessary in order to unlock the door latching mechanism. Hence, the mechanism cannot be thrown inadvertently to either its open or closed positions.

Two interlock switch members are combined with the door latching mechanism 30 and the automatic locking means 38 at the back of the oven. The first interlock switch is a single pole, single throw latch switch 63 that is held open during normal cooking operations by the position of the rod 39 as is seen in FIGURE 2, and the switch is adapted to be closed when the door latching mechanism 30 is moved to its closed position thereby causing the movable rod 39 to move forwardly and release the movable contact so it closes with the fixed contact and completes a circuit therethrough. The second interlock switch is a single pole, single throw lock switch 65 that is normally closed when the solenoid 54 is de-energized as is shown in FIGURE 3. This switch is engaged and held closed by a collar 66 formed on the plunger 53 of the solenoid when the solenoid is de-energized. Hence, when the solenoid 54 is energized, the plunger 53 drops and the lock switch 65 is open-circuited. The effect of these two interlock switches 63 and 65 will best be understood during the explanation of the wiring diagram of FIGURE 4 which follows.

The electric range of the present invention is provided with an electrical service of three-wire Edison source of power; nominally of 240 volts, single phase, 60 cycle, A.C. which is usually available in the average resistance having adequate wiring. This voltage source has a pair of line wires L1 and L2 with a voltage of 240 volts therebetween and a grounded neutral conductor N with half voltage or 120 volts measured across any line wire L1 and L2 with the neutral conductor N for supplying the electrical load of the oven characterized by the three heating elements; the baking element 16, the broiling element 17 and the mullion or perimeter heater 18. The power supply circuit to the load is broken by an oven selector switch 68 which serves to make and break the circuit and set-up the various circuit combinations which are available to the housewife for the normal cooking operations such as baking, broiling and time baking as well as for setting up the high temperature heat cleaning cycle for automatically removing the food soil from the walls of the oven liner.

There is also a low voltage temperature control circuit for an oven thermostat or responder 69 which is supplied power from a step-down transformer 70 to furnish about 12 volts in a circuit that includes the responder 69, a variable resistance temperature sensor 71, a biasing resistor 72 which is adapted to shift the control point of the sensor from the normal cooking temperature range to a high temperature heat cleaning range as will be explained hereinafter, and an output relay R-2 having single throw, double pole switch contacts 73, 73, for completing the circuit to the heating elements in the event heat is desired.

In addition to the power circuit and the low voltage temperature control circuit, there is a door latch control circuit that includes the following elements, a solenoid 54 in cooperation with a lock switch 65, a latch switch 63 cooperating with the movable rod 39 of the door latching mechanism 30, and a sequence timer 75 having an electric motor driving a series of cams to operate three timer switches 76, 77 and 78. Moreover, there is a single pole, single throw clean switch 102 enclosed in the timer and which is manually operated by setting the timer dial to the circuit connections for these various electrical components as will be described in more detail hereinafter.

The oven selector switch 68 is provided with a plurality of switch contacts that are each labelled with the particular operation that is involved when the contacts are closed. These contacts are identified as elements 80–88. For example, during a baking operation contacts 80, 83, 85 and 86 are closed. During a broiling operation, contacts 81, 85 and 86 are closed. During a time baking operation contacts 80, 83, 84 and 86 are closed. Finally, during a heat cleaning operation contacts 80, 82, 86, 87 and 88 are closed.

The baking circuit has the bake element 16 connected directly across lines L1 to L2 at 240 volts, while at the same time the broil element 17 is connected across line L2 and Neutral N at half voltage. The circuit may be traced from line L2 through oven switch contacts 86 and by leads 90, 91 through thermostat contacts 73, leads 92 and 93 to bake element 16, lead 94 through thermostat contacts 73, lead 95 to oven switch contacts 83 to line L1. At the same time the broil unit is connected to lead 93 by lead 96 and to neutral N by lead 97 through oven switch contacts 80.

The broiling circuit has the broil element 17 as the only heating element that is energized and it is connected across lines L1 and L2 at 240 volts. The circuit is from line L2 through switch contacts 86 and leads 90, 91 through thermostat contacts 73, leads 92, 93 and 96 and through broil unit 17, and by lead 97 through oven switch contacts 81 to line L1.

The time baking circuit is the same as the baking circuit except that oven timer contacts 98 are located between line L1 and oven switch contacts 84 for controlling power to the transformer 70 so as to be able to make and break the circuit the bake and broil elements 16 and 17 as a function of the position of the cams of the oven timer as is well understood by those skilled in this art. When the oven timer contacts 98 are opened, the transformer 70 is de-energized thus opening the thermostat contacts 73, 73. During the heat cleaning operation all three heating elements, the bake element 16, the broil element 17 and the mullion heater 18 are connected in parallel across line L2 and neutral conductor N at 120 volts. One side of the mullion heater 18 is connected to line L2 through oven switch contacts 86 and leads 90, 91, thermostat contacts 73, leads 92 and 99, while the other side of the heater is connected to neutral conductor N through lead 100.

Turning back to a consideration of the temperature control responder or thermostat 69, it is of the general type that is taught in the United States patent to Baker 2,962,575. Such devices have proved to be quite satisfactory for use as oven thermostats for normal cooking operations. However, none of them have been commercially available at a reasonable price to extend over a wide temperature range that would cover, in addition to the normal cooking temperatures, the heat cleaning temperatures rising between about 750° F. and 950° F. and still have the necessary degree of accuracy throughout the entire range of temperatures. An improvement has been made in this control system by the cooperation of a biasing resistor 72 that is shunted across the variable-resistance temperature sensor 71 when the heat cleaning temperature range is desired. The sensor 71 is preferably a resistor having a high temperature coefficient of resistance and it is located within the oven cavity 13 to detect the oven air temperature therein. This shunt resistor 72 functions to shift the control point of the circuit by dropping the effective resistance of the sensor so as to be able to attain accurate results for the complete range of temperatures for the oven. This feature of the design is disclosed and claimed in the recently issued patent of Stanley B. Welch No. 3,122,626 which is assigned to the General Electric Company, the assignee of the present invention.

The responder 69 is a manually settable thermostatic device that includes a pulsing voltage regulating relay (not shown) in series with the sensor 71 so that the sensor varies the effective output voltage of the relay in accordance with the sensed temperature within the oven cavity regardless of variations in the line voltage. The thermostat includes a responder relay (not shown) that receives the effective output voltage of the voltage regulating relay and controls an output relay R–2 that includes the double pole thermostat contacts 73, 73 which were mentioned previously as being the switching means for controlling the heating elements of the oven.

Returning to the door latch control circuit, the sequence timer 75 is used only during the heat cleaning operation and this timer includes a timer motor, the three timer switches 76, 77 and 78 and a clean switch 102. The timer switch 76 is a single pole double throw switch having fixed contacts 103 and 104, while the switches 77 and 78 are single pole, single throw switches. The sequence timer 75 has four periods of operation during a complete cycle; namely, Off, Wait, Clean and Cool. In order to begin the heat cleaning cycle, the oven selector switch 68 is set at the Clean position which will close contacts 80, 82, 86, 87 and 88 thereby energizing the solenoid 54 across line L2 and neutral N through oven switch contacts 87 and leads 105, 106, through timer switch 76 to contact 103 and lead 107, through the solenoid 54, and by lead 108 to lead 100 and back to neutral N. This pulls the plunger 53 of the solenoid down thereby dropping the locking pin 60 of the automatic locking means 38 out of the detent 56 making it possible for the handle lever 31 of the door latching mechanism 30 to be swung to its closed position locking the oven door 15. The closing movement of the handle lever 31 causes the movable rod 39 to shift forwardly thereby allowing the latch switch 63 to close as seen in FIGURE 3.

Also, the clean switch 102 of the sequence timer 75 is set to close and this energizes the timer motor thereby indexing the timer cam into a Wait period of about ten minutes duration at which time the timer switch 77 is open and the clean switch 102 is held closed. An indicator lamp 110 is shunted across the sequence timer 75 by leads 111 and 112 so as to be energized whenever the timer is operating thus informing the housewife when the Clean cycle has been initiated. During the ten minute Wait period, the oven door 15 may be unlatched and opened since the solenoid 54 remains energized thereby overriding the automatic locking means 38. The cleaning cycle may be discontinued by either or both unlatching the door and turning the oven selector switch 68 to the Off position. The latch switch 63 would be opened thereby stopping the timer motor, but the timer switch 77 will remain open and the clean switch 102 closed. As a result of this, the clean switch 102 will not have to be actuated the next time the clean cycle is started.

A ninety minute Clean period follows the ten minute Wait period. The Clean period is started by the closing of both the timer switch 78 and timer switch 76 moving to its other position as being closed with contact 104. The closing of timer switch 78 will energize the transformer 70 across line L1 and neutral N by means of leads 114, 115, 116 to one side of the transformer 70, and then by lead 117 to lead 100 and back to neutral N. The energized transformer 70 will supply power to the oven responder 69 which will cause the responder contact HL to close thereby energizing the output relay R–2 of the responder. The responder contact HL will open and close at some predetermined oven temperature that is set by the manual dial (not shown) of the responder positioned at a Clean position. The output relay R–2 is connected across line L2 and neutral N by means of lead 119 from line L2 through the responder 69 and lead 120 to the relay R–2 and lead 121 from the relay to lead 100 and then back to neutral N. Notice that the opening of the timer switch 76 with respect to contact 103 will de-energize the solenoid 54, hence, allowing the automatic locking means 38 to engage the door latching mechanism 30 and prevent this mechanism from being moved.

Moreover, the plunger 53 of the solenoid will rise until it closes the lock switch 65 and this energizes a relay R–1 in the temperature control circuit which controls three switches 123, 124 and 125. The relay R–1 itself is energized in the following circuit from line L2 through oven switch contacts 87 and leads 105, lead 106 through timer switch 76 closed with contact 104, and then through the lock switch 65, and by lead 127 back through oven switch contacts 88 and by lead 128 to one side of the relay R–1, then by lead 129 through a bi-metal safety switch 130 which is an over-temperature switch that opens whenever the oven air temperature reaches a maximum of about 1000° F. Then by lead 131 to lead 100 and then back to neutral N. This relay R–1 serves to connect the mullion heater 18 in the cleaning circuit by closing switch 123. This connects the mullion heater 18 in parallel with both the bake and broil elements 16 and 17 across line L2 and neutral. Moreover, this relay R–1 will set the responder 69 from the normal temperature range to the heat cleaning temperature range by means of movement of switches 124 and 125 to connect the biasing resistor 72 across the temperature sensor 71. This will cause the oven responder contacts HL to open and close at a clean temperature of approximately 880° F. which is pre-set at the factory and not controllable by the housewife. The responder contacts H–L will cycle open and closed thereby breaking and making a circuit to the output relay R–2 which in turn will open and close contacts 73, 73 thereby controlling the power delivered to the heating elements. Switch 125 is a double-pole switch that is shown in the position of FIGURE 4 as being closed with contact 126 when the responder is set for normal cooking operations. When closed with the other contact 132, the responder is provided with the biasing resistor 72 for cleaning operations as mentioned heretofore. An oven pilot light 133 is connected in the circuit across line L2 and neutral by means of leads 134 and 135 so as to cycle On and Off with the opening and closing of the responder contacts 73, during Baking or Cleaning. There is also an indicator lamp 136 connected between line L2 and neutral N by means of oven switch contacts 86 to be energized whenever the oven switch 68 is set to a heating position.

The heat cleaning cycle may be stopped at any time by merely turning off the oven selector switch 68 thereby cutting the power to all of the heating elements. This does not cut the power to the sequence timer 75 which will continue running. Thus, the door latching mechanism 30 will remain locked by the automatic locking means 38 since the solenoid 54 remains de-energized as long as the timer runs.

At the end of the Clean cycle, the sequence timer 75 will go into a twenty-minute Cool period. The cool period is started by the opening of timer switch 76 into an intermediate position not making contact with either of its contacts 103 or 104. This will de-energize the relay R–1 thereby opening the relay switches 123 and 124 and closing switch 125 with contact 126, which will cut out the mullion heater 18 as well as the biasing resistor 72 thereby causing the oven responder 69 to be set back to its normal cooking temperature range. Moreover, this will cut off the power to all of the heating elements in the same manner that the opening of the bimetal safety 130 accomplishes this result.

At the end of the Cool period, the clean switch 102 and the timer switch 78 will open, and the timer switch 76 will close with contact 103 and timer switch 77 will close. This switching will terminate the Clean cycle and will likewise energize the solenoid 54 thereby opening the lock switch 65 and dropping the lock pin 60 out of the detent 57 thereby enabling the manual operation of the door latching mechanism 30. The transformer 70 will be de-energized when the timer switch 78 is opened and this in turn will cut the power to the oven responder 69 and open the responder contacts H–L thereby de-energizing the output relay R–2 and open the responder contacts 73, 73 thereby cutting off the power to the bake and broil elements 16 and 17, respectively. The opening of the clean switch 102 will stop the motor of the timer 75 and also shut off the indicator lamp 110. This will denote to the housewife that the clean cycle is terminated so that the door may be unlatched and the oven switch 68 turned off. The solenoid 54 will be de-energized when the oven switch 68 has been turned off. This operation will automatically lock the door latch mechanism 30 in the unlatched position with the locking pin 60 located in detent 56.

The basic heat cleaning operation is controlled through the oven switch 68 and by the solenoid 54, door latching mechanism 30, sequence timer 75 and the relay R–1. These components are only used in the door latch control circuit when the oven switch 68 is set to a Clean position. As a result, the circuit may be used for the normal cooking operations of Bake, Broil and Time Bake without any interference from the door latch control circuit.

Modifications of this invention will occur to those skilled in this art and therefore it is to be understood that this invention is not limited to the particular embodiments disclosed, but that it is intended to cover all modifications which are within the true spirit and scope of this invention as claimed.

What I claim as new and desire to secure by Letters Patent of the United States is:

1. A heated cavity and an access door for closing said cavity, heating means connected to a source of energy for raising the temperature within the cavity, and door latching means movable between open and closed positions and adapted to hold the door in a closed position during a high temperature cycle, locking means for locking the door latching means in its closed position, and electroresponsive means for releasing the locking means, and control means for energizing the electroresponsive means, and means to de-activate the control means during the high temperature cycle so that the door latching means may not be unlocked and the door opened during such cycle.

2. A high temperature oven for domestic use comprising a cabinet structure enclosing a box-like oven liner that has an open front provided with an access door that cooperates with the oven liner to define an oven cooking cavity, means for supplying heat energy into the oven cavity for normal cooking operations between about 150° F. and 550° F. as well as for a heat cleaning operation between about 750° F. and 950° F. for removing food soil lodged on the walls of the oven liner, and door latching means movable between open and closed positions for holding the door closed during the heat cleaning operation, and a spring-actuated locking means automatically engageable with the door latching means when the door latching means is in its closed position, and an electroresponsive means connected with the said locking means, circuit control means for the electroresponsive means so that when the electroresponsive means is energized it disables the locking means and permit the free movement of the door latching means, and timer means for controling the length of the heat cleaning cycle, and means to de-activate the circuit control means during the heat cleaning cycle so that the door latching means may not be unlocked and the door opened until the oven temperature returns to within the normal cooking temperature range.

3. A self-cleaning oven for domestic use having a heated cavity formed by an insulated box-like body and an access door for closing said cavity, heating element means for converting an energy source into heat, and a selector switch means governing the supply of power to the heating element means for normal cooking operations between about 150° F. and about 550° F. as well as for a heat cleaning operation between about 750° and about 950° F. for removing food soil lodged on the walls of the oven cavity, and door latching means movable between open and closed positions and adapted to hold the door closed during the heat cleaning operations; the invention comprising means for locking the door latching means in the closed position during the heat cleaning operation so that the oven door may not be opened, and an electroresponsive means for releasing the locking means at the completion of the heat cleaning operation so that the oven door may be opened.

4. In a domestic oven comprising an insulated cabinet supplied with an oven liner and an access door to form an oven cooking cavity, electrical heating means for said oven cavity, a circuit network adapted to connect the heating elements to an electrical power supply, switching means for the circuit network to effect baking, broiling and heat cleaning operations, the baking and broiling operations having normal cooking temperatures between about 150° F. and about 550° F., while the heat cleaning operation is carried out at temperatures between about 750° F. and about 950° F. for removing food soils lodged on the walls of the oven cavity, and door latching means movable between open and closed positions for holding the door closed during the heat cleaning operation; the invention comprising spring-actuated locking means for locking the door latching means in its closed position, interlock switch means in the circuit network of the heat cleaning operation that is closed when the door latching means reaches the closed position, release means for the locking means, and means for deactivating the release means whenever the door latching means is in a closed position and held closed by the locking means and the oven temperature is above the normal maximum cooking temperature of about 550° F., whereby the oven door is latched closed and may not be opened while the oven temperature is above normal cooking temperatures.

5. In a domestic oven as recited in claim 4 with the addition of a second interlock switch means in the circuit network of the heat cleaning operation that is closed when the locking means is in its locked position before the heat cleaning operation can be initiated.

6. In a domestic oven as recited in claim 4 wherein the door latching means includes a movable rod extending to the back of the oven liner and is provided adjacent its end with a pair of spaced keeper portions representing the open and closed positions of the door latching means, the locking means being biased into one of the keeper portions depending upon the position of the door latching means.

7. In a domestic oven as recited in claim 6 with the additon of a second interlock switch means in the circuit network of the heat cleaning operation that is closed when the locking means is in its locked position while the door latching means is also in its locked position before the heat cleaning operation can be initiated.

8. A cooking apparatus comprising walls defining an oven cavity, one wall of the cavity including a door for gaining access thereto, heating means supplied for the oven, and cleaning means operable for the automatic cleaning of the inner walls of the cavity by causing the heating means to raise the temperature of the cavity to a maximum temperature in the range of about 750° F. to about 950° F. and thereby degrade food soil adhering to the cavity walls, means controlling said heating means to heat said cavity to within said temperature range; the invention comprising door latching means for sealing the door of the oven cavity at temperatures above about 550° F., the door latching means being movable between open and closed positions, a movable rod connected to the door latching means, the rod extending to the back of the apparatus and away from the door, an automatic locking means cooperable with the rear end of the said rod for locking the door latching means in the closed position, the said control means including both an interlock switch means that is closed when the door latching means reaches the closed position, and a second interlock switch means that is closed when the automatic locking means is in its locked position thereby insuring that the door is held closed by the door latching means and the door latching means is held closed by the automatic locking means before the automatic cleaning cycle can be initiated, and release means for overcoming the automatic locking means so as to allow the manual operation of the door latching means, and sequence timer means to control the length of the cleaning cycle and to cause the operation of the release means only after the completion of the cleaning cycle when the temperature has returned to within the normal cooking temperature range of about 550° F. and below.

9. A cooking apparatus as recited in claim 8 wherein the automatic looking means, the two interlock switch means and the release means are all located at the back of the apparatus away from the oven door so as to be in a relatively cool area, the said automatic locking means being a spring-biased member that is engageable with a portion of the movable rod, the said release means being an electroresponsive means that is connected to the said spring-biased member for overcoming the action of the spring in order to be able to unlock the door.

10. The heated cavity as recited in claim 1 wherein the said locking means include spring-actuated means.

11. The heated cavity as recited in claim 10 wherein the said means to de-activate the control means during high-temperature cycle include time-responsive means.

12. The self-cleaning oven as recited in claim 3 wherein the means for locking the door latching means include spring-actuated means.

13. A high temperature oven for domestic use comprising a cabinet structure enclosing a box-like oven liner that has an open front provided with an access door that cooperates with the oven liner to define an oven cooking cavity, means for supplying heat energy into the oven cavity for normal cooking operations between about 150° F. and about 550° F. as well as for a heat cleaning operation between about 750° F. and about 950° F. for removing food soil lodged on the walls of the oven liner, and door latching means movable between open and closed positions for holding the door closed during the heat cleaning operation, and locking means for locking the door latching means when the door latching means is in its closed position, and electroresponsive means for releasing the said locking means, circuit control means for the electroresponsive means so that when the electroresponsive means is energized it releases the locking means and means to de-activate the circuit control means during the heat cleaning operation so that the door latching means may not be unlocked and the door opened during said operation.

14. The oven as recited in claim 13 with the addition of timer means for controlling the length of the heat cleaning operation, and wherein the said locking means include spring-actuated means.

15. The oven as recited in claim 14 wherein the said means to de-activate the control circuit means during the heat cleaning operation include time-responsive means.

16. In a domestic oven comprising an insulated cabinet supplied with an oven liner and an access door to form an oven cooking cavity, electrical heating means for said oven cavity, a circuit network adapted to connect the heating elements to an electrical power supply, switching means for the circuit network to effect baking, broiling and heat cleaning operations, the baking and broiling operations having normal cooking temperatures between about 150° F. and about 550° F., while the heat cleaning operation is carried out at temperatures between about 750° F. and about 950° F. for removing food soils lodged on the walls of the oven cavity, and door latching means movable between open and closed positions for holding the door closed during the heat cleaning operation; the invention comprising spring-actuated locking means for locking the door latching means in its closed position, interlock switch means in the circuit network of the heat cleaning operation that is closed when the locking means reaches the latch-locking position, release means for the locking means, and means for de-activating the release means whenever the door latching means is in a closed position and held closed by the locking means and the oven temperature is above the normal maximum cooking temperature of about 550° F., whereby the oven door is latched closed and may not be opened while the oven temperature is above normal cooking temperatures.

References Cited by the Examiner

UNITED STATES PATENTS

| | | | |
|---|---|---|---|
| 3,113,200 | 12/1963 | Hurko | 217—409 |
| 3,121,158 | 2/1964 | Hurko | 219—397 |
| 3,214,567 | 10/1965 | Chisholm | 219—413 |

RICHARD M. WOOD, *Primary Examiner.*

ANTHONY BARTIS, *Examiner.*

C. L. ALBRITTON, *Assistant Examiner.*